United States Patent [19]

Kramer et al.

[11] Patent Number: 4,533,571
[45] Date of Patent: Aug. 6, 1985

[54] METHOD AND APPARATUS FOR UNIFORMLY COATING A SUBSTRATE WITH A POWDER

[75] Inventors: Carl Kramer; Hans-Werner Kuster, both of Aachen, Fed. Rep. of Germany

[73] Assignee: Saint Gobain Vitrage, Courbevoie, France

[21] Appl. No.: 588,330

[22] Filed: Mar. 12, 1984

[30] Foreign Application Priority Data

Mar. 14, 1983 [FR] France .................. 83 04125

[51] Int. Cl.³ .............................................. B05D 1/12
[52] U.S. Cl. ..................................... 427/180; 427/421; 239/132.3; 239/8; 239/434; 239/593; 118/311
[58] Field of Search ............... 239/132.3, 8, 434, 593, 239/601, 597, 434.5, 590.3, 427.3; 118/301, 311; 427/421, 180

[56] References Cited

U.S. PATENT DOCUMENTS

| 4,019,887 | 4/1977 | Kirkbride et al. ............. 65/60 C |
| 4,193,773 | 3/1980 | Staudinger ............... 239/427.3 X |
| 4,230,271 | 10/1980 | Marcault .................. 239/597 |
| 4,401,695 | 8/1983 | Sopko ..................... 118/308 |

FOREIGN PATENT DOCUMENTS

| 2753268 | 6/1979 | Fed. Rep. of Germany . |
| 3117715 | 11/1982 | Fed. Rep. of Germany . |
| 2277049 | 1/1976 | France . |
| 2427141 | 12/1979 | France . |
| 1482315 | 8/1977 | United Kingdom . |
| 2081136 | 2/1982 | United Kingdom . |

Primary Examiner—Shrive P. Beck
Attorney, Agent, or Firm—Pennie & Edmonds

[57] ABSTRACT

A method and apparatus are described for coating a substrate such as glass with a powder such as a compound that an be decomposed by heat. The method comprises the steps of forming a sheet of powder suspended in a gas and moving toward the substrate to be coated, homogenizing the mixture of powder and gas by creating turbulences in it, surrounding the sheet with flowing gas having the same velocity as the sheet itself, and accelerating the sheet in the direction of the substrate. This method and the apparatus which implements it are particularly useful in the manufacture of glass coated with a film such as metal oxide.

16 Claims, 2 Drawing Figures

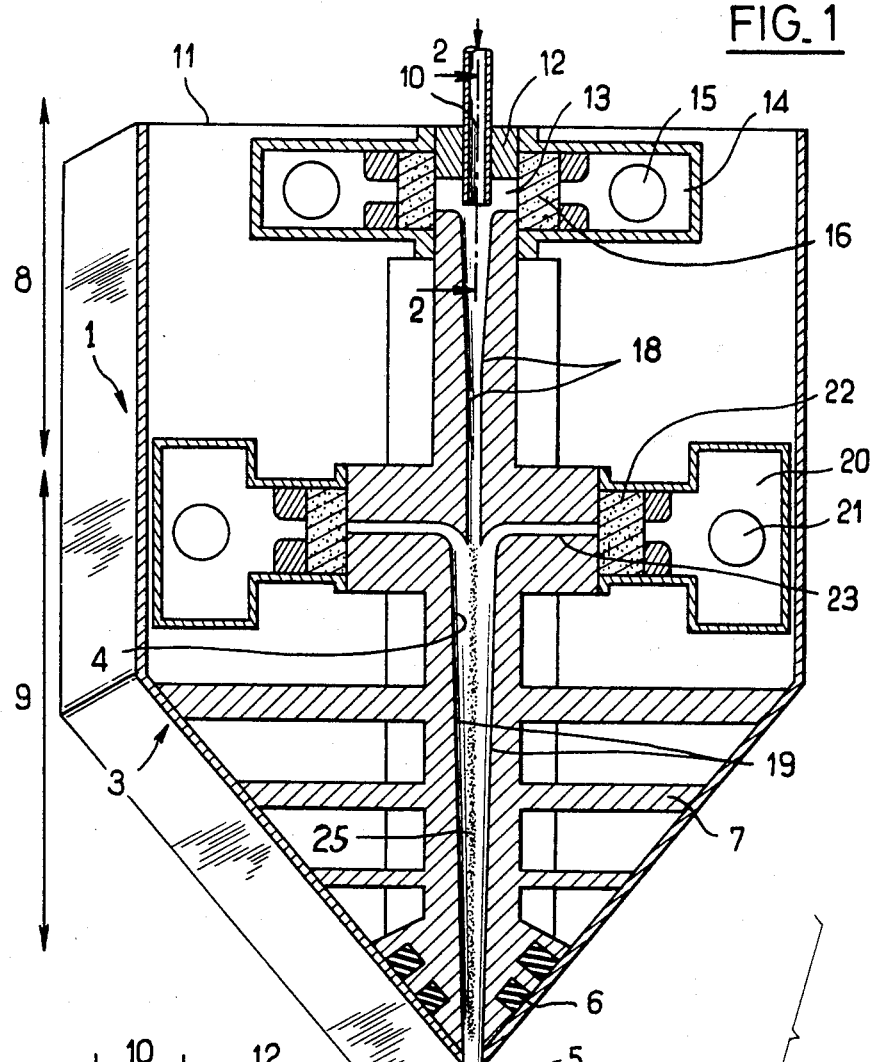
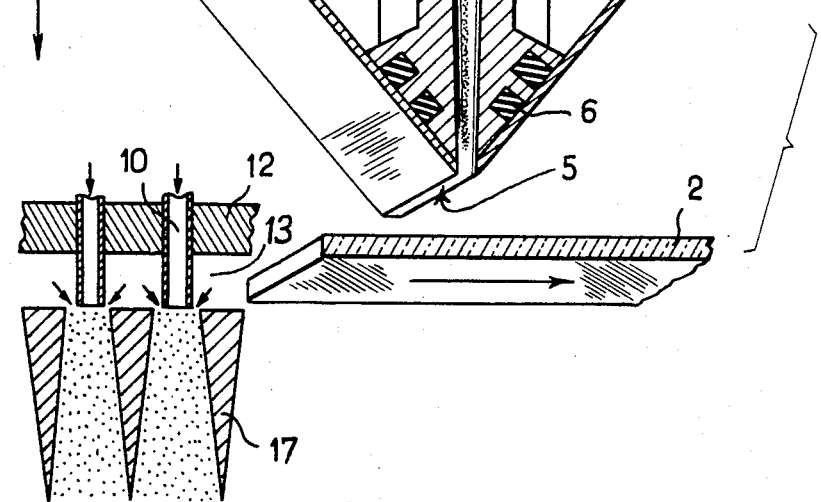

METHOD AND APPARATUS FOR UNIFORMLY COATING A SUBSTRATE WITH A POWDER

CROSS-REFERENCE TO RELATED APPLICATION

A related commonly owned application Ser. No. 588,329 is "A Uniformly Coated Substrate and Method and Apparatus for Its Manufacture," filed concurrently herewith, which is incorporated herein by reference.

BACKGROUND OF THE INVENTION

This relates to the uniform coating of a substrate with a powder and more particularly to the uniform distribution of a powder through a slit to coat a substrate with a film having particular properties. For example, in the case or a glass substrate, the film might provide particular optical and electrical properties for the glass.

U.S. Pat. No. 4,230,271 and its corresponding French Pat. No. 2 427 141, which are incorporated herein by reference, describe an elongated nozzle for continuously distributing gas-entrained powders across a substrate. A stream of powder suspended in a gas is introduced into the nozzle through a multiplicity of conduits arranged in a row extending the length of the nozzle. The powder stream is then diluted with additional gas in an approximately rectangular homogenization chamber likewise extending the entire length of the nozzle. The gas-entrained powder is then directed through a passage that is oval in cross-section with walls that initially diverge, are then parallel and finally converge at a distribution slit above the substrate. Additional gas may be introduced into the powder stream by a gas supply located in the middle of the oval.

While this nozzle gives advantageous results, it is still quite susceptible to clogging and periodically requires cleaning to continue operating correctly. The downtime for cleaning results in lost production. Moreover, while such nozzles have been made with distribution slit lengths of 250 to 650 mm., the glass ribbons they are used to coat may be several meters wide, requiring the use of several identical nozzles placed end to end to coat the full width of the ribbon. In such circumstances, it is extremely difficult to balance the various nozzles so as to assure a regular distribution of powder coating over the entire width of the glass. It would be preferable to use a single nozzle with a distribution slit as long as the several meters of width of the glass ribbon; but it has been found that when the length of the nozzle is increased appreciably, the regularity of powder distribution is reduced. In particular, the track of the powder feed conduits can be discerned on the glass and clogging is faster.

SUMMARY OF THE INVENTION

The present invention aims at remedying these drawbacks while making it possible to coat several meters of width of a substrate such as the entire width of a glass ribbon made on a float installation.

In accordance with the invention, a gas-entrained powder stream is introduced by a multiplicity of separate feed conduits into an enclosed homogenization chamber. There the powder is diluted by additional gases that are blown into the enclosure at right angles to the direction of the powder stream to create turbulences. The entrained powder is then exhausted from the enclosure through a narrow slit to form a thin sheet whose length extends over the entire width of the substrate to be coated. This sheet of entrained powder is then surrounded by two additional jets of gas that extend over the entire length of the sheet on each side, have the same velocity as the sheet and are aimed approximately in the direction of the substrate. The sheet of powder is then accelerated in the direction of the substrate by making the walls of the enclosure converge uniformly.

An illustrative embodiment of a nozzle for projection of powder in accordance with the invention comprises an enclosure that extends in substantially the same cross-section through the entire length of the nozzle except as detailed below. At the end of the nozzle remote from the substrate to be coated is an input portion comprising a homogenization chamber. A multiplicity of powder conduits are arranged in a row feeding into this chamber along with two slits on either side of the row of powder conduits which supply a uniform distribution of a homogenization gas uniformly distributed over the entire length of the enclosure. The entrained powder is formed into a moving sheet that, upon leaving the homogenization chamber, passes betwen two slits that introduce an acceleration gas on either side of the full extent of the sheet. The powder is accelerated by narrowing the walls of the enclosure down to the distribution slit at its distal end.

BRIEF DESCRIPTION OF THE DRAWING

These and other objects, features and advantages of the invention will be more readily apparent from the following detailed description of a preferred embodiment of the invention in which:

FIG. 1 is a cross-sectional view of a preferred embodiment of the present invention; and FIG. 2 is a longitudinal cross-sectional view along lines 2—2 of a portion of the embodiment of FIG. 1.

DESCRIPTION OF PREFERRED EMBODIMENT OF INVENTION

FIG. 1 shows, in cross section, a powder distribution nozzle 1 of the present invention. The nozzle is used to coat a powder on a substrate 2, one of the substrate and nozzle being moved relative to the other. Illustratively, substrate 2 is a glass ribbon passing at uniform speed under nozzle 1 which is kept stationary. The direction of movement of substrate 2 is indicated by the arrow in FIG. 1. Advantageously, the nozzle extends longitudinally across the entire substrate in the direction perpendicular to its direction of movement, a distance that may range from about fifty centimeters to several meters. Throughout this longitudinal extent, the cross-section of the nozzle is substantially the same except for a detail described in conjunction with FIG. 2 and a pair of side plates that close off the nozzle at either end.

Nozzle 1 comprises a body 3 in which there is a narrow enclosure 4 through which the powder travels and a distribution slit 5 from which the powder is discharged. The width of enclosure 4 is on the order of only 1/50 to 1/100 of its height and its variations are relatively slignt and in any case are continuous and regular.

Nozzle 1 also contains in its lower portion cooling elements 6 such as water conduits to prevent overheating of the nozzle tip because of the proximity of the substrate 2 which is generally at a high temperature for coating with the powder. Advantageously, various reinforcements or braces 7 are used to maintain the shape of the nozzle.

Nozzle 1 comprises two zones superimposed in height, an upper zone 8 called the homogenization zone and a lower zone 9 called the acceleration zone, through which enclosure 4 extends. Enclosure 4 is fed powder at its upper end, generally in suspension in a primary gas such as air, by a multiplicity of feed conduits 10 that are regularly distributed in a row in the lengthwise direction of the nozzle in an upper wall 11 of nozzle body 3. For example, the conduits may be uniformly spaced about 5 cm. from one another.

Conduits 10 illustratively are supplied from the division of one or more equivalent elementary conduits, coming from a supply of powder suspended in a gas. Alternatively, a worm screw located at the base of a hopper filled with powder may be used to extract a measured amount of powder that can then be diluted, suspended in gas and set in motion by the addition of gas, generally air, under pressure.

Fluid tightness around conduits 10 is provided by a seal 12. After passing through the upper wall 11 of nozzle body 3, conduits 10 enter a relatively wide substantially rectangular chamber 13, extending the entire length of the nozzle to form a parallelepiped and constituting the upper part of zone 8 of enclosure 4. At the distal end of chamber 13, walls 18 of enclosure 4 are smoothly tapered from a relatively wide entrance to a narrower exit.

A gas, called homogenization gas, generally air, is supplied to chamber 13 at substantially right angles to the powder stream from conduits 10 by two identical pressure chambers 14 that extend the length of chamber 13 on either side of it. Gas is supplied to chambers 14 under pressure from conduits 15 that have holes in their walls; and the gas from chambers 14 enters chamber 13 through walls 16 made of "Poral" type porous material.

Feed conduits 10 extend into chamber 13 to a point near where walls 18 of enclosure 4 begin their taper. As shown in the longitudinal section of FIG. 2, blades 17 in the shape of triangular prisms are located between adjacent conduits 10 to divide the jets of powder coming from each conduit 10 and to maintain with tapered walls 18 a fairly constant cross section in the region where the powder released by conduits 10 enters enclosure 4. This minimizes variations in the velocity of the powder which could result in deposits on the walls. Advantageously, the homogenization gas makes the distribution of the powder uniform over the entire length of the nozzle, homogenizes the mixture of primary air and powder and counteracts powder deposits.

In response to the homogenization gas, the powder released by conduits 10 into enclosure 4 forms a stream 25 of powder suspended in the gas and snaped like a sheet, i.e., a thin continuous stream having the length of the nozzle and extending to the nozzle output between the approximately vertical walls of enclosure 4. With increasingly greater distance from the feed conduits, homogenization of the mixture of gas and powder and the uniformity of its distribution on the inside of enclosure 4 increases as the powder advances to the nozzle output. Advantageously, the two walls 18 of enclosure 4 which face one another in homogenization zone 8 converge slightly toward one another. Consequently, there are a slight acceleration of the powder and a rolling of the sheet-like powder stream 25 which improve the homogeneity and uniformity of the distribution even more. At the end of homogenization zone 8, the mixture of powder and gas distributed from the separate jets of conduits 10 has become uniformly distributed over the entire cross-section of the powder stream.

The powder stream then enters acceleration zone 9. It is important to give the powder stream a forward velocity from the output of the nozzle that is at least on the order of 10 to 15 m/s for several reasons: to obtain a sufficient coating of substrate 2 in a short time, which is particularly necessary in the case of rapid movement of the substrate, to obtain a good adherence of the powder on the substrate, and to keep the powder from flying away between the moment it is released by distribution slit 5 at the output end of the nozzle and the moment when it comes in contact with the substrate. On the other hand, to the extent that the reaction of the powder on the substrate 2 requires a high temperature, it is also important not to cool the substrate too much and therefore it is necessary to limit the amount of gas used to carry the powder. For example, when powders of organometallic compounds of the DBTO (dibutyltin oxide) or DBTF (dibutyltin difluoride) type with a grain size less than 20 um are projected onto glass substrates for decomposition of these compounds into metal oxides under the effect of heat, the impact velocities of the powder on the glass should advantageously be between 15 and 35 m/s.

Acceleration of the powder suspended in the sheet-like stream 25 is achieved in acceleration zone 9 by convergence of walls 19 and by injection of additional gas, such as air, at high velocity along the sides of the sheet-like stream, throughout the entire length of the nozzle.

Advantageously, to avoid turbulences in the stream that can create clogging and destroy the homogeneity and uniformity of the distribution of the powder mixture in the carrier gas, the convergence of the walls is regular to provide a constant acceleration. Thus, the two wall portions 19 are plane walls forming an angle on the order of 5° with the median plane and at their end delimiting a distribution slit 5 of about 4 mm in width. This width is about 3 to 4 times narrower than the width of enclosure 4 at the input of the acceleration zone.

Additional gas is injected into the acceleration zone through two identical chambers 20 that extend the length of the nozzle on either side of enclosure 4 at approximately mid-height. Gas is supplied to chambers 20 under pressure from conduits that have holes in their walls; and the gas from chambers 20 enters enclosure 4 through a porous plate 22 of the "Poral" type and a channel 23. The two channels 23 come out on each side of the sheet-like product stream 25 coming from the homogenization zone and the gas is injected at the same velocity as the powder suspended in the sheet. Joining of these three currents at the input of acceleration zone 9 requires an opening width in enclosure 4 that is approximately 3 times greater than that at the distal end of the homogenization zone. Since the three currents that unite have the same velocity, no shear occurs and the homogeneity and uniformity obtained at the end of the homogenization zone are maintained.

As will be apparent from the foregoing discription, numerous modifications may be made within the spirit and scope of the invention. The longitudinal extent of the nozzle can be whatever is required to coat the full width of a substrate that is moved past the nozzle. While the nozzle is oriented above the substrate in the vertical direction in the drawing, nozzle 1 can be used in various positions: above or below the substrate to be coated, perfectly vertical or inclined to the vertical, or laic horizontally or approximately horizontally if, for example, the substrate is vertical.

The nozzle may be used in many different applications to distribute powders of different natures (organometallic compounds, plastics, paints, varnishes, enamels, inks, pigments, etc.) regularly over substrates such as glass, metal, wood, paper, etc. To make glass coated with layers having particular optical qualities, it is possible to distribute powders having bases of different metals (tin, indium, titanium, chromium, iron, cobalt . . . ) and, by way of nonlimiting example, powders of cibutyltin oxide, dibutyltin difluoride, metal acetyl acetonates, etc.

What is claimed is:

1. A method for regularly distributing a powder on a substrate comprising the steps of:

introducing the powder into an elongated nozzle through a multiplicity of separate feeds that enter the nozzle at points removed from the substrate to be coated, mixing the powder in an enclosure in said nozzle with gases that are blown into said enclosure uniformly over the entire length of said enclosure, channeling the powder suspended in the gas between the opposite walls of a slit leading from the enclosure to form a thin sheet of powder whose length extends over the entire width of the substrate, surrounding the sheet of powder with additional gas streams having the same velocity as the powder sheet and extending over the entire length of the sheet on each side and aimed approximately in the direction of the substrate, and accelerating the powder sheet in the direction of the substrate.

2. The method of claim 1 wherein the gases blown into the enclosure are aimed approximately in a direction perpendicular to the direction of advance of the powder toward the substrate.

3. The method of claim 1 further comprising the step of accelerating the powder slightly between the time it leaves the enclosure and the time it is surrounded by the gas streams.

4. The method of claim 1 wherein the velocity of advance of the powder toward the substrate is kept above 10 to 15 m/s.

5. Apparatus for regularly distributing a powder on a substrate comprising:

means for introducing the powder into an elongated nozzle through a multiplicity of separate feeds that enter the nozzle at points removed from the substrate to be coated, means for mixing the powder in an enclosure in said nozzle with gases that are blown into said enclosure uniformly over the entire length of said enclosure input, means for channeling the powder suspended in the gas between the opposite walls of a slit leading from the enclosure to form a thin sheet of powder whose length extends over the entire width of the substrate, means for surrounding the sheet of powder with additional gas streams having the same velocity as the powder sheet and extending over the entire length of the sheet on each side and aimed approximately in the direction of the substrate, and means for accelerating the powder sheet in the direction of the substrate.

6. The apparatus of claim 5 wherein the gases blown into the enclosure are aimed approximately in a direction perpendicular to the direction of advance of the powder toward the substrate.

7. The apparatus of claim 5 further comprising means for accelerating the powder slightly between the time it leaves the enclosure and the time it is surrounded by the gas streams.

8. The apparatus of claim 5 wherein the velocity of advance of the powder toward the substrate is kept above 10 to 15 m/s.

9. An elongated nozzle for projecting powder on a substrate, said nozzle comprising:

an input portion in which are received a multiplicity of powder feed conduits aimed in the direction of the substrate and a homogenization gas that is uniformly distributed over the entire length of the enclosure, a narrow slit extending the length of the nozzle and leading from the input portion in which slit the powder is substantially uniformly distributed in a sheet, and an acceleration portion comprising a chamber extending the length of said nozzle to which said narrow slit is connected and through which said sheet moves, said chamber further comprising two additional slits, for introduction of an acceleration gas, said two slits extending the entire length of the chamber, one on each side of the slit through which the sheet moves, and on the opposite side of the chamber from said narrow slit a distribution slit from which the sheet is projected toward the substrate.

10. The nozzle of claim 9 wherein the slits for introduction of an acceleration gas are aimed at the substrate.

11. The nozzle of claim 9 wherein the acceleration gas is introduced into the chamber at a speed such that the acceleration gas and the powder meet while at approximately the same velocity.

12. The nozzle of claim 9 wherein the inputs of the powder feed conduits are divided by blades placed crosswise and having the shape of prisms whose point is oriented toward the substrate.

13. The nozzle of claim 9 wherein at the distal end of the powder feed conduits a prism-shaped blade is mounted between each pair of adjacent powder feed conduits with its point oriented toward the substrate.

14. The nozzle of claim 9 further comprising means for accelerating the sheet of powder toward the substrate.

15. The nozzle of claim 9 wherein the walls of the chamber in the acceleration portion are tapered to provide a narrower cross-section at the distribution slit, whereby the sheet of powder is accelerated toward the substrate.

16. The nozzle of claim 9 wherein the homogenization gas and the acceleration gas are air.

* * * * *